United States Patent
Imlach et al.

(10) Patent No.: US 9,687,019 B2
(45) Date of Patent: Jun. 27, 2017

(54) FOOD PRESS SYSTEMS, DEVICES, COMPONENTS AND METHODS

(71) Applicants: Joseph Imlach, Anchorage, AK (US); Thane Humphrey, Wasilla, AK (US)

(72) Inventors: Joseph Imlach, Anchorage, AK (US); Thane Humphrey, Wasilla, AK (US)

(*) Notice: Subject to any disclaimer, the term of this patent is extended or adjusted under 35 U.S.C. 154(b) by 7 days.

(21) Appl. No.: 14/287,319

(22) Filed: May 27, 2014

(65) Prior Publication Data
US 2014/0356504 A1 Dec. 4, 2014

Related U.S. Application Data

(60) Provisional application No. 61/828,121, filed on May 28, 2013.

(51) Int. Cl.
| | | |
|---|---|---|
| *A23P 1/10* | (2006.01) | |
| *A47J 43/20* | (2006.01) | |
| *A23P 30/10* | (2016.01) | |
| *A22C 7/00* | (2006.01) | |

(52) U.S. Cl.
CPC ............. *A23P 1/105* (2013.01); *A23P 30/10* (2016.08); *A47J 43/20* (2013.01); *A22C 7/003* (2013.01); *A22C 7/0069* (2013.01); *A22C 7/0076* (2013.01)

(58) Field of Classification Search
CPC ........ A47J 43/20; A22C 7/0076; A22C 7/004; A22C 7/0069; A22C 7/003; A23P 30/10; A23P 1/105
USPC ................................. 425/318, 355, 408, 363
See application file for complete search history.

(56) References Cited

U.S. PATENT DOCUMENTS

| | | | | |
|---|---|---|---|---|
| 2,228,644 | A * | 1/1941 | Sackas | A47J 43/20 100/233 |
| 2,574,831 | A * | 11/1951 | Jameson | A22C 7/0076 425/182 |
| 4,106,162 | A * | 8/1978 | Fournier | A22C 7/0046 425/298 |
| D377,138 | S | 1/1997 | Angelo | |
| 5,645,869 | A | 7/1997 | Riubrugent | |
| 6,644,953 | B2 | 11/2003 | Kishek | |
| 6,932,998 | B2 | 8/2005 | La Bruno et al. | |
| D523,707 | S | 6/2006 | Williams | |
| 7,128,554 | B2 | 10/2006 | Palese | |
| D535,164 | S | 1/2007 | St. Germain et al. | |
| 7,175,417 | B2 | 2/2007 | La Bruno et al. | |
| D621,668 | S | 8/2010 | Zemel | |
| 8,029,265 | B2 | 10/2011 | Hauser | |
| 8,202,073 | B1 | 6/2012 | Kovalevich et al. | |
| 2006/0078642 | A1* | 4/2006 | Palese | A22C 7/0046 425/416 |
| 2007/0074632 | A1* | 4/2007 | Nadal-Linares | A22C 7/0046 100/234 |

(Continued)

*Primary Examiner* — Seyed Masoud Malekzadeh
(74) *Attorney, Agent, or Firm* — Woods Patent Law, P.A.

(57) ABSTRACT

Disclosed are various embodiments of a food press that utilizes mechanical devices, such as lever arms, inclined planes, cams, and/or rollers to increase the force applied to food by a ratio of two to one or more in comparison to the force applied by a human operator to the device. High compression forces are particularly important when working with low fat foods such as low-fat hamburger, game meat, flaked or ground fish or ground vegetable products. The various embodiment of food presses described and disclosed herein may also be used to produce stuffed food products.

19 Claims, 9 Drawing Sheets

(56) References Cited

U.S. PATENT DOCUMENTS

| | | | |
|---|---|---|---|
| 2008/0175968 A1* | 7/2008 | Bloom | A22C 7/0046 426/512 |
| 2010/0107900 A1 | 5/2010 | Hanson | |
| 2011/0111104 A1 | 5/2011 | Thompson | |
| 2012/0269938 A1 | 10/2012 | Davison, III | |

* cited by examiner

FOOD PRESS SYSTEMS, DEVICES, COMPONENTS AND METHODS

RELATED APPLICATIONS

This application claims priority and other benefits from U.S. Provisional Patent Application Ser. No. 61/828,121 entitled "Press for Creating Stuffed and Non-Stuffed Hamburgers or Other Food Products" to Imlach et al. filed on May 28, 2013 (hereafter "the '121 patent application"). The '121 patent application is hereby incorporated by reference herein in its entirety.

FIELD OF THE INVENTION

Various embodiments of the inventions described herein relate to the field of food presses.

BACKGROUND

Hamburger presses and other food forming devices are well known in the art. Commercially available hamburger or food presses tend to be low-end hand operated presses with a 1:1 or slightly greater ratio of compression that do not generate sufficient pressure to fully compact meat or food products. See, for example, U.S. Pat. Nos. 8,202,073; 8,029,265; 7,247,011; D621,668; D535,164; D523,707; D377,138; and U.S. Patent Publication Numbers 2012/0269938; 2011/0111104; 2010/0107900 where such presses and food forming devices are disclosed. Several prior art low-cost food presses, including some disclosed in the foregoing patents and patent applications, are configured to produce stuffed burgers, or burgers with ingredients enclosed inside the meat either before or after cooking. More complex commercial grade machines often utilize combinations of gears and mechanical leveraging components, and are designed for the high volume production of meat or food patties. Such machines are usually too expensive and complicated for home use. See, for example, U.S. Pat. Nos. 7,175,417; 7,128,554; 6,932,998; 6,644,953; 5,645,869.

What is needed is a food or hamburger press that is inexpensive, not unduly complicated or elaborate, and that is capable of providing an increased amount of force to a food product.

SUMMARY

In one embodiment, there is provided a food press comprising a first food compression member, a second food compression member configured to engage or be engaged by at least portions of the first food compression member, a frame or base comprising at least one guide configured to constrain movement substantially along a single direction of at least one of the first and second food compression members, and at least one lever operably connected to the frame or base and configured for a user or external force to act upon to compress or cause to be compressed food placed between the first and second food compression members, wherein the first food compression member, the second food compression member and the lever are together configured to compress or cause to be compressed food placed between the first and second food compression members to form a shaped and compressed food product, and at least one of the first and second food compression members is further configured to engage the guide and to be constrained thereby to move substantially in a single direction as the user or external force acting upon the lever causes the food compression members to compress the food therebetween.

In another embodiment, there is provided a food press comprising a first food compression member, a second food compression member configured to engage or be engaged by at least portions of the first food compression member, a third rotatable food compression member configured to operate in conjunction with the first and second food compression members, a frame or base comprising at least one guide configured to constrain movement substantially along a single direction of at least one of the second food compression members and the third food compression member, and at least one lever operably connected to the frame or base and configured for a user or external force to act upon to cause the lever or a portion of the lever to engage one or more first portions of the third compression member as the lever or a portion of the lever is pressed against the first portions by the user or the external force thereby to cause an end of the third compression member to rotate and cause the third compression member to compress or cause to be compressed food placed between the first and second food compression members, wherein the first food compression member, the second food compression member, the third food compression member and the lever are together configured to compress or cause to be compressed food placed between the first and second food compression members to form a shaped and compressed food product, and at least one of the second and third food compression members is further configured to engage the at least one guide and to be constrained thereby to move substantially in a single direction as the user or external force acting upon the lever causes the third food compression member to compress the food between the first and second food compression members.

In still another embodiment, there is provided a method of forming a shaped and compressed food product using a food press comprising a first food compression member, a second food compression member configured to engage or be engaged by at least portions of the first food compression member, a frame or base comprising at least one guide configured to constrain movement substantially along a single direction of at least one of the first and second food compression members, and at least one lever operably connected to the frame or base and configured for a user or external force to act upon to compress or cause to be compressed food placed between the first and second food compression members, wherein the first food compression member, the second food compression member and the lever are together configured to compress or cause to be compressed food placed between the first and second food compression members to form a shaped and compressed food product, and at least one of the first and second food compression members is further configured to engage the guide and to be constrained thereby to move substantially in a single direction as the user or external force acting upon the lever causes the food compression members to compress the food therebetween, the method comprising: (a) placing food in or on the first or second food compression members, and (b) pressing the lever against the second food compression member to cause the food to be compressed between the first and second food compression members thereby to form the shaped and compressed food product.

In yet another embodiment, there is provided a method of forming a shaped and compressed food product using a food press comprising a first food compression member, a second food compression member configured to engage or be engaged by at least portions of the first food compression member, a third rotatable food compression member configured to operate in conjunction with the first and second food compression members, a frame or base comprising at least one guide configured to constrain movement substantially along a single direction of at least one of the second food compression member and the third food compression member, and at least one lever operably connected to the frame or base and configured for a user or external force to act upon to cause the lever or a portion of the lever to engage one or more first portions of the third compression member as the lever or a portion of the lever is pressed against the first portions by the user or the external force thereby to cause an end of the third compression member to rotate and cause the third compression member to compress or cause to be compressed food placed between the first and second food compression members, wherein the first food compression member, the second food compression member, the third food compression member and the lever are together configured to compress or cause to be compressed food placed between the first and second food compression members to form a shaped and compressed food product, and at least one of the second and third food compression members is further configured to engage the at least one guide and to be constrained thereby to move substantially in a single direction as the user or external force acting upon the lever causes the third food compression member to compress the food between the first and second food compression members, the method comprising: (a) placing food in or on the first or second food compression members, and (b) pressing the lever against the second food compression member to cause the food to be compressed between the first and second food compression members thereby to form the shaped and compressed food product.

Further embodiments are disclosed herein or will become apparent to those skilled in the art after having read and understood the specification and drawings hereof.

BRIEF DESCRIPTION OF THE DRAWINGS

Different aspects of the various embodiments will become apparent from the following specification, drawings and claims in which:

The drawings are not necessarily to scale. Like numbers refer to like parts or steps throughout the drawings.

DETAILED DESCRIPTIONS OF SOME EMBODIMENTS

Described herein are various embodiments of systems, devices, components and methods corresponding to a food press.

The various embodiments disclosed and described herein relate to a food processing system for forming shaped and compressed food products comprising ground beef, ground game, ground or flaked fish, vegetarian product, or any other suitable malleable foods. Devices and methods are provided that use mechanical systems, devices and components to increase the pressure applied to form and shape compressed food products, including food products with low fat content. Low fat foods tend to crumble during handling when insufficient pressure is applied during the shaping and compression process. The disclosed systems, devices, components and methods result in a force applied to the food that is at least twice the force applied. The disclosed systems, devices, components and methods may also be used to prepare food products that can be stuffed with other ingredients.

Figure 1:
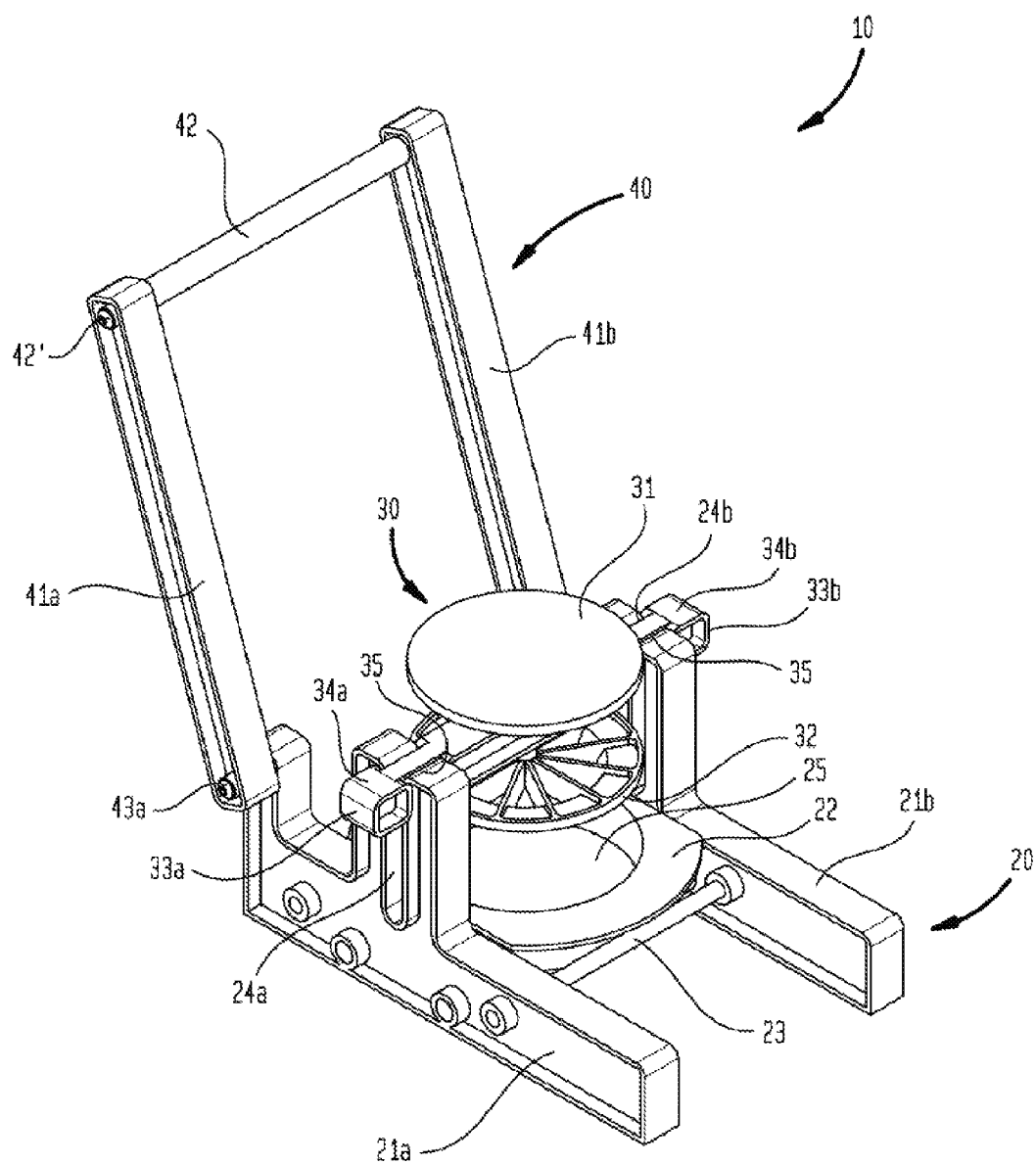
FIG. 1 shows a top front left perspective view of one embodiment of food press 10 with lever 40 in an open position and food compression assembly 30 in a first configuration and orientation.
Figure 2:
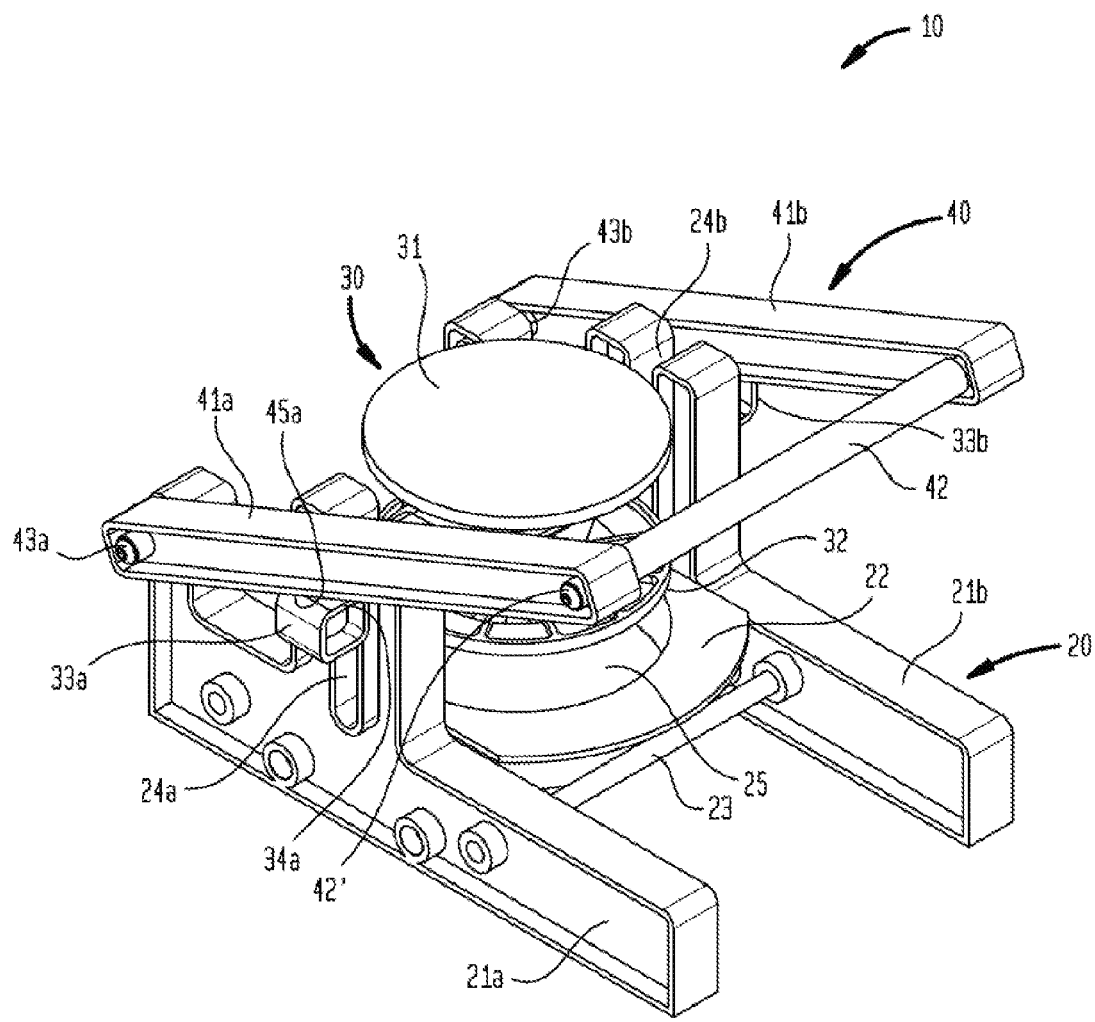
FIG. 2 shows a top front left perspective view of the embodiment of food press 10 shown in FIG. 1 with lever 40 in a closed position and food compression assembly 30 in the first configuration and orientation.
Figure 3:
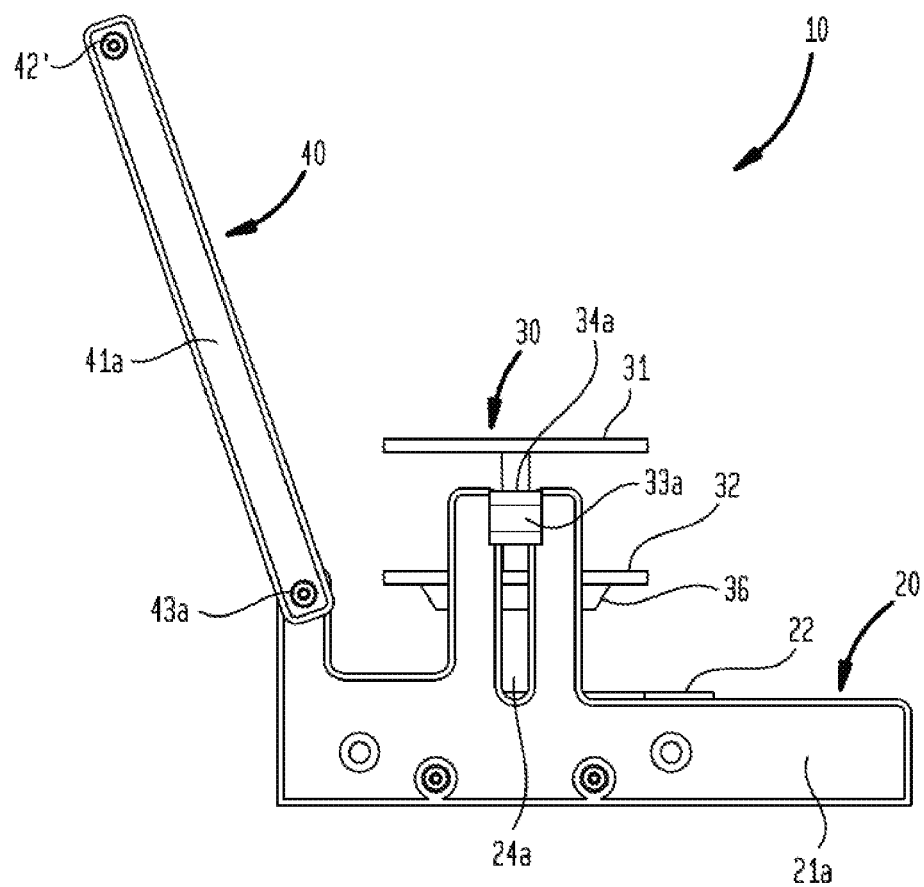
FIG. 3 shows a left side view of the embodiment of food press 10 shown in FIG. 1 with lever 40 in an open position and food compression assembly 30 in the first configuration and orientation.
Figure 4:
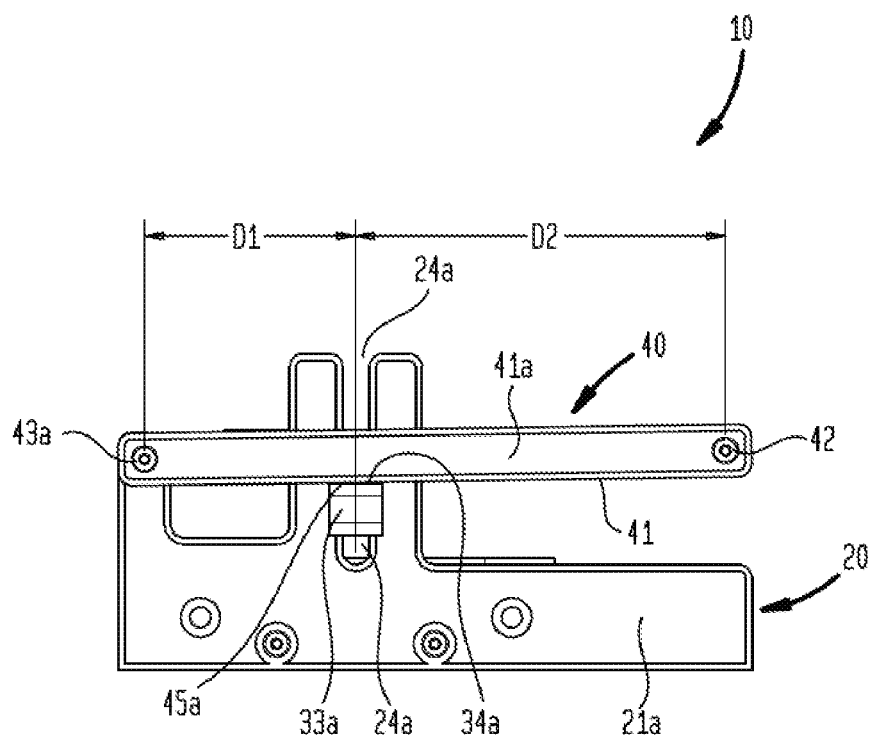
FIG. 4 shows a left side view of the embodiment of food press 10 shown in FIG. 1 with lever 40 in a closed position and food compression assembly 30 in the first configuration and orientation.
Figure 5:
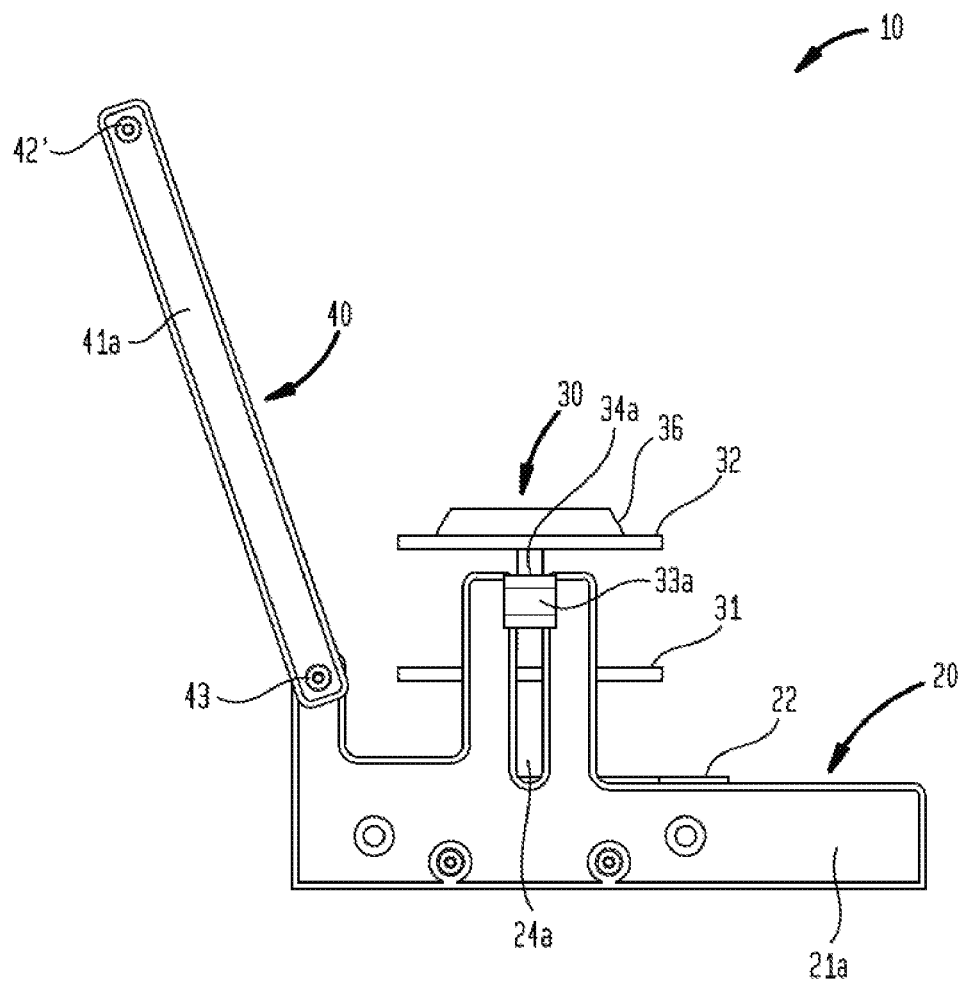
FIG. 5 shows a left side view of the embodiment of food press 10 shown in FIG. 1 with lever 40 in an open position and food compression assembly 30 in a second configuration and orientation.
Figure 6:
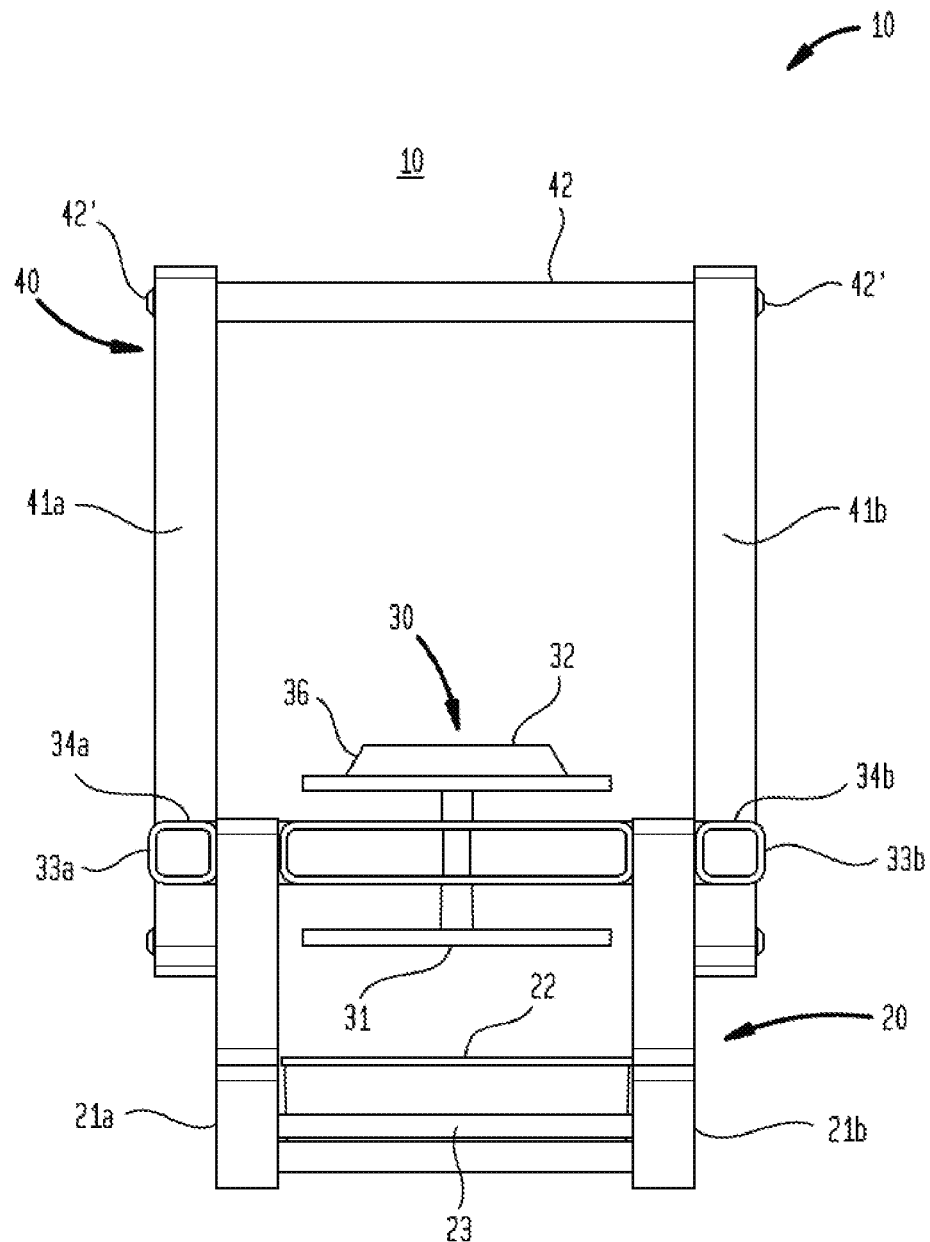
FIG. 6 shows a front view of the embodiment of food press 10 shown in FIG. 1 with lever 40 in an open position and food compression assembly 30 in the second configuration and orientation.

Referring first to FIGS. 1 through 6, there are shown various views according to one embodiment of a food press 10. FIG. 1 shows a top front left perspective view of one embodiment of food press 10 with lever 40 in an open position and food compression assembly 30 in a first configuration and orientation, where second food compression member 31/32 is positioned such that truncated cone 32/36 is disposed facing downward (see also FIG. 3). FIG. 2 shows a top front left perspective view of the embodiment of food press 10 shown in FIG. 1 with lever 40 in a closed position and food compression assembly 30 in the first configuration and orientation. FIG. 3 shows a left side view of the embodiment of food press 10 shown in FIG. 1 with lever 40 in an open position and food compression assembly 30 in the first configuration and orientation. FIG. 4 shows a left side view of the embodiment of food press 10 shown in FIG. 1 with lever 40 in a closed position and food compression assembly 30 in the first configuration and orientation. FIG. 5 shows a left side view of the embodiment of food press 10 shown in FIG. 1 with lever 40 in an open position and food compression assembly 30 in a second configuration and orientation, where second food compression member 31/32 is positioned such that substantially flat food press plate 31 is disposed facing downward (see also FIG. 6). FIG. 6 shows a front view of the embodiment of food press 10 shown in FIG. 1 with lever 40 in an open position and food compression assembly 30 in the second configuration and orientation.

Referring now to FIG. 1, there is shown one embodiment of food press 10 comprising food compression assembly 30, which comprises second food compression members 31/32, and first food compression member 22. Second food compression member 31/32 is configured to engage at least portions of the first food compression member 22, and to compress food placed in food receptacle 25 therebetween. Food press 10 comprises base or frame 20 (or base assembly 20), press head or food compression assembly 30, and lever or lever arm assembly 40. Base assembly 20 further comprises one or more base elements 21a and 21b. Base elements 21a and 21b may be spaced apart from one another by one or more spacer elements 23. One function base elements 21a and 21b provide is to support base mold or first food compression member 22 into which food is placed and compressed in receptacle 25. Receptacle 25 is illustrated as a round substantially cylindrical or tapered section in FIGS. 1 through 6, but may assume any other suitable desired configuration (e.g., cylindrical, square, rectangular, star-shaped, tapered, non-tapered, etc.). Another function base or frame elements 21a and 21b provide is to furnish guides 24a and 24b, which constrain the movement of press head assembly or second food compression member 31/32. In FIG. 1, guides 24a and 24b are provided by slots formed into base or frame elements 21a and 21b. Guides 24a and 24b engage a portion 35 of press head assembly or second food compression member 31/32 of crossbar 33a/33b such that the motion of press head assembly or second food compression member 31/32 is substantially vertical with respect to base or frame 20. It will be appreciated that other methods of constraining the motion of press head assembly or second food compression member 31/32 are contemplated, such as rod and sleeve combinations. Guides 24 have been discovered to be important to forming shaped and compressed food products, and in forming cavities, pockets or indentations in food products, that are of uniform and predictable thickness, and that do not vary in thickness from one side to another owing to the press head undesirably tilting or moving out of a substantially horizontal orientation during the food compression process. A third function base elements 21a and 21b provide is to furnish pivot points 43a and 43b that allow the lever or lever arm assembly 40 to rotate with respect to base assembly, or base or frame 20.

In the embodiment of food press 10 shown in FIG. 1, the lever system provides for increased force applied to the food product relative to the force applied to the handle by a user. This increased force is necessary to fully compact some food products so that they maintain their structure during cooking. The increased force is also beneficial when creating stuffed food products, as it creates a better seal around the stuffing ingredients than can be provided by prior art devices. This higher force, however, also increases the tendency of the press head to tilt. It is through the combination of the one or more guides and the increased force that the system provides that a uniform, consistent, well compacted and sealed food product can be produced.

In the embodiment of food press 10 shown in FIG. 1, press head assembly or second food compression member 31/32 comprises at least one press head 31 and crossbar 33a/33b. As shown, assembly 31/32 may include an additional press head 32 to facilitate the creation of stuffed food products. Crossbar 33a/33b has surfaces 35 that engage with guides 24a and 24b of base elements 21a and 21b. Press head assembly or second food compression member 31/32 also comprises surfaces 34a and 34b that are configured to engage corresponding surfaces 45a and 45b of lever 40 (see, e.g., FIGS. 2, 3 and 4). Force is transmitted from lever or lever arm assembly 40 to press head assembly or second food compression member 31/32 through contact between surfaces 34a and 45a, and 34b and 45b. The force is then transmitted through crossbar 33a/33b to press heads 31 or 32 and then to food placed in receptacle 25. In the embodiment shown in FIGS. 1 through 5, lever or lever arm assembly 40 comprises at least one lever arm 41a and 41b, pivot point 43a and 43b, and at least one handle 42.

In the embodiment shown in FIGS. 1 through 6, frame or base 20 comprises guides 24a and 24b, which are configured to constrain movement substantially along a single direction of second food compression member 31/32. Second food compression member 31/32 is configured to be pushed downwardly against or towards first food compression member 22 with the aid of guides 24a and 24b, and through the action of lever 40, to compress food placed in food receptacle 25. Other configurations are contemplated, however, where, for example, first food compression member 22 is pushed upwardly against first food compression member 31/32, or where one or both of first and second food compression members 22 and 31/32 are constrained to move in a horizontal direction, a direction that is neither completely horizontal nor completely vertical, and so on.

In FIGS. 1 through 6, second food compression member 31/32 is shown as comprising two different food press plates, 31 and 32. With its flat surface, food press plate 31 of FIG. 1 through 5 is configured to form patties in conjunction with first food compression member 22, while food press truncated cone 32/36 (see FIGS. 3 and 5) is configured to form a pocket or cavity in food to facilitate stuffing. As further shown in FIGS. 1 through 6, second food compression member 31/32 is reversible in guides 24a and 24b according to whether a patty is to be formed from the food, or a cavity for stuffing is to be formed in the food.

Numerous other embodiments of second food compression member 31/32 and first food compression member 22 are contemplated, such as second food compression member 31 having only one plate or surface for engaging and forming food placed in receptacle 25, and/or first and/or second compression members 22 and 31/32 together being configured to shape and compress food into a concave shape, a convex shape, circular shape, a patty shape, a cylindrical shape, a rectangular shape, a square shape, a crenulated shape, a star shape, a triangular shape, an irregular shape, a wavy shape, a geometrically symmetrical shape, geometrically asymmetrical shape, a bar shape, a rod shape, a round shape, a spherical shape, or an elliptical shape. Second food compression member 31/32 may further comprise first and second press heads that are configured to shape food differently from one another (e.g., convex or concave shapes, ridges, channels, smooth or textured surfaces, holes, depressions or detents, etc.). Other shapes and configurations of the shaped and compressed food product are also contemplated.

Continuing to refer to FIGS. 1 through 6, at least one lever 40 is operably connected to frame or base 20 and is configured for a user or external force to act upon to compress or cause to be compressed food placed between first and second food compression members 22 and 31/32. First food compression member 22, second food compression member 31/32, and lever 40 are together configured to compress or cause to be compressed food placed between first and second food compression members 22 and 31/32 to form a shaped and compressed food product. In place of providing force through the action of a human user, an external force may also be provided to lever 40 by, for example, a motor and corresponding mechanical linkage(s) operably connected to lever 40. As shown in FIGS. 1 through 6, second food compression member 31/32 is further configured to engage guides 24a and 24b and to be constrained thereby to move substantially in a single direction (e.g., a vertical direction) as the user or external force acting upon lever 40 causes food disposed between second food compression member 31/32 and first food compression member 22 to compress food therebetween. As further shown in FIGS. 1 through 6, second food compression member 31/32 further comprises crossbar 35 configured to engage and slide in first and second guides 24a and 24b. Protrusions 33a and 33b of crossbar 35 comprise top surfaces 34a and 34b which are configured to be engaged by underside portions 45a and 45b (see FIGS. 2 and 4) of lever 40 as lever 40 is pressed downwardly against second food compression member 31/32 and top surfaces 34a and 34b thereof.

Many different shapes and configurations of guide or guides 24 are contemplated, including, but not limited to, slot(s), channel(s), at least one tab, geared teeth, ratchet(s), pawl(s), pinion(s), gear rack(s), toothed bar(s), groove(s), ridge(s), and tongue(s). Guide or guides 24 may also be configured to operate on first food compression member 22, or to operate on both of first and second food compression members 22 and 31/32. Whichever food compression member is or are configured to operate in conjunction with one or more guides 24, such food compression member preferably comprises at least one mechanical element that is configured to engage and mate with the at least one guide 24.

As shown in FIGS. 1 through 6, first food compression member 22 comprises food receptacle 25. Other configurations are contemplated, however, such as food receptacle 25 forming a portion of second food compression member 31/32. As further shown in the embodiment of FIGS. 1 through 6, first food compression member 22 is operably attached or secured to, and forms a portion of, base or frame 20, by being secured to first and second base elements or legs 21a and 21b. Second food compression element 31/32 is also disposed between first and second base elements 21a and 21b. Other configurations are contemplated, such as where either or both of first and second food compression members 22 and 31/32 are not attached or secured to frame or base 20 other than through the action and engagement of at least one guide 24 thereto.

In FIGS. 1 through 6, lever 40 comprises proximal and distal portions, where the proximal portion of lever 40 is pivotably connected to frame or base 20 by pivots 43a and 43b. Other means of connecting lever 40 to base or frame 20 are also contemplated, including, but not limited to, pins, bolts, screws, nuts, rods, and/or swingable, swivelable, rotatable and hingeable connections to the base or frame 20. As further shown in FIGS. 1 through 6, the distal portion of lever 40 comprises at least one handle 42 for a user to grab or hold when compressing or causing to be compressed food placed between first and second food compression members 22 and 31/32. Handle 42 is connected to lever arms 41a and 41b by bolts or screws 42.

Referring now to FIG. 2, the embodiment of FIG. 1 is illustrated in a partially closed position. Press head assembly or second food compression member 31/32 has been engaged with guides 24a and 24b of base elements 21a and 21b, and has been lowered to contact food placed in receptacle 25 (food not shown in FIGS. 1 through 6). Lever or lever arm assembly 40 has been rotated about pivot point 43a and 43b such that it presses against crossbar 33a/33b of press head assembly or second food compression member 31/32.

Referring now to FIG. 3, there are shown differences between two types of press head elements 31 and 32. Press head element 31 comprises an essentially flat face and is used primarily to compress food placed into base mold or first compression member 22. Press head element 32 comprises a protruding section 36 configured to form a cavity in the food when pressed therein. In one embodiment protruding section 36 is configured in the shape of a truncated cone, which has been found to be advantageous for forming a maximum volume for placing stuffing ingredients into the shaped and compressed food product. Other shapes and configurations such as truncated spherical sections are also contemplated.

FIG. 4 illustrates some mechanical properties of the embodiment of food press 10 shown in FIGS. 1-3, 5 and 6. Lever 40 has been rotated about pivot points 43a and 43b such that lever surfaces 45a and 45b are pressing against surfaces 33a and 33b of crossbar 35. Mechanical leverage arises from the fact that the distance D1 between the pivot points 43a and 43b and the contact points between lever 40 and crossbar 35 is significantly smaller than the distance (D1+D2) between the pivot points 43a and 43b and handle 42 where force is applied by a user. The force applied to the food is in the ratio of (D1+D2)/D1. In some embodiments, this ratio is greater than about 2 and may range up to about 3 or greater. As a result, first and second food compression members 22 and 31/32 are together configured to provide a second compressional force to food placed therebetween that is at least twice a first force applied by the user or an external force to lever 40. In some embodiments, the second force may range between about two times and about three times the first force, or may exceed three times the first force, depending on the distances D1 and D2 selected when configuring food press 10.

FIG. 5 illustrates a configuration of the embodiment shown in FIGS. 1 through 4 in which press head assembly or first food compression member 31/32 has been flipped over in relation to the configuration shown in such Figures. This reversible press head assembly feature allows convenient forming of stuffed food products. In operation, a first portion of malleable food such as hamburger, ground game meat, ground or flaked fish, ground vegetable product or the like is placed in food receptacle 25 of base mold or first food compression member 22. Press head assembly or second food compression member 30 is engaged with guides 24a and 24b with second press head 32 oriented downwards as in FIG. 3. Lever or lever arm assembly 40 is rotated about pivot points 43a and 43b and a downwards force is applied to handle 42. This compresses the food and forces protruding section 36 of press head 32 into the food, creating an indentation or cavity. Press head assembly or second food compression member 31/32 is then removed from food press 10 allowing access to the food in receptacle 25. Stuffing ingredients may then be placed in the indentation or cavity formed in the food. A second portion of malleable food is then placed on top of the stuffing ingredients. Press head assembly or second food compression member 31/32 is then re-engaged with guides 24a and 24b with first press head element 31 oriented downwards. Lever or lever arm assembly 40 is rotated about pivot points 43a and 43b, and a downwards force is applied to handle 42. This compresses the food once again and seals the stuffed ingredients inside the food to form a shaped and compressed food product containing stuffing. Press head assembly or second food compression member 31/32 may then be removed, allowing subsequent removal of base mold or first food compression member 22. Base mold or first food compression member 22 may then be inverted to release the shaped and compressed food product therefrom.

FIG. 6 shows a front view of embodiment of FIGS. 1 through 5. The ends of the crossbar 33a/33b of press head assembly or second food compression member 31/32 extend outside base elements 21a and 21b to allow press surfaces 45a and 45b of the lever 40 to contact press surfaces 34a and 34b of crossbar 33a/33b. It will be appreciated that any other suitable configuration that permits lever or lever assembly 40 to apply a leveraged force to press head assembly or second food compression member is also contemplated.

Figure 7:
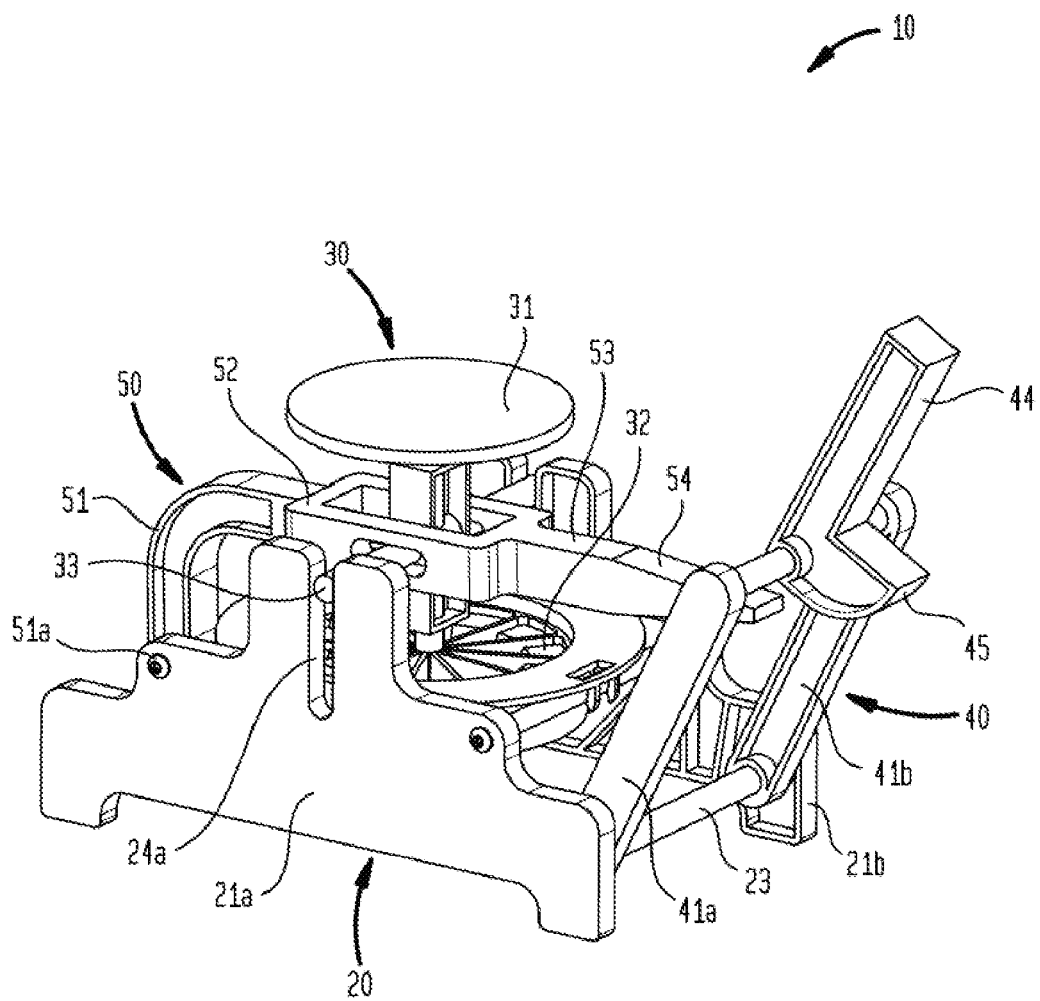
FIG. 7 shows an embodiment of food press 10 that utilizes a cam mechanism.
Figure 8:
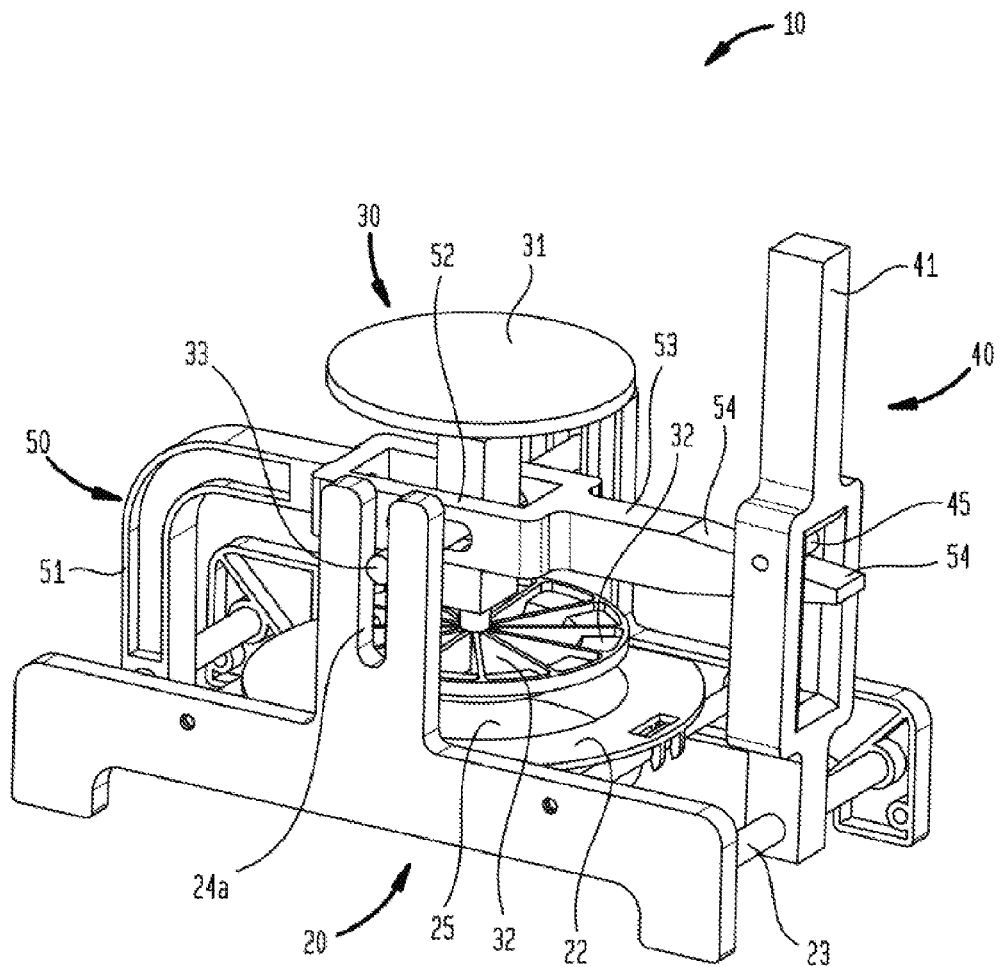
FIG. 8 shows an embodiment of food press 10 that utilizes an inclined plane mechanism.

Referring now to FIGS. 7 and 8, there are shown further embodiments of food press 10. In FIGS. 7 and 8, food press 10 comprises food compression assembly 30, which comprises first food compression member 22 and second food compression member 31/32. Second food compression member 31/32 is configured to engage or be engaged by at least portions of first food compression member 22. Third rotatable food compression member 50 is configured to operate in conjunction with first and second food compression members 22 and 31/32 and frame or base 20 comprising at least one guide 24a and 24b. Guides 24a and 24b are configured to constrain movement substantially along a single direction of second food compression member 31/32, which in turn is engaged by third food compression member 50 by means of frame 52, which contain slots or recesses through which crossbars 33 protrude to engage guides 24a and 24b. At least one lever or lever assembly 40 is operably connected to frame or base 20, and is configured for a user or external force to act upon to cause the lever 40 or a portion of lever 40 such as roller 45 to engage one or more first portions 54 of third compression member 50 as lever 40 or a portion of the lever 45 is pressed against first portions 54 by the user or an external force applied thereto to cause end 51 of third compression member 50 to rotate downwardly and cause third compression member 50 to compress or cause to be compressed food placed between first and second food compression members 22 and 31/32. First food compression member 22, second food compression member 31/32, third food compression member 50, and lever or lever assembly 40 are thus together configured to compress or cause to be compressed food placed between first and second food compression members 22 and 31/32 to form a shaped and compressed food product. At least one of second and third food compression members 31/32 and 50 is further configured to engage the at least one guide 24a and 24b and to be constrained thereby to move substantially in a single direction as the user or external force acting upon lever or lever assembly 40 causes third food compression member 50 to compress food between first and second food compression members 22 and 31/32.

Referring now to FIG. 7 only, the illustrated embodiment of food press 10 comprises base or frame or base assembly 20, food compression assembly 30 comprising press head assembly or second food compression member 31/32 and first food compression member or base mold 22, third food compression member 50, and lever or lever assembly 40. Guides 24a and 24b ensure vertical motion of the second food compression member 31/32 relative to base or base assembly 20. In this embodiment, mechanical force multiplication is provided by cammed surface 45 acting on bearing surface 54 of third food compression member 50. In operation, handle 44 is rotated against third compression member 50 such that cammed surface 45 acts on bearing surface 54 of third food compression member 50. In this embodiment, third food compression member 50 rotates about a pivot point located near the bottom of third compression member frame 51, and handle 44 rotates about arm 42.

Referring now to FIG. 8 only, the illustrated embodiment of food press 10 comprises base or frame or base assembly 20, food compression assembly 30 comprising press head assembly or second food compression member 31/32 and first food compression member or base mold 22, third food compression member 50, and lever or lever assembly 40. Guides 24a and 24b ensure vertical motion of second food compression member 31/32 relative to base or base assembly 20. In this embodiment, mechanical force multiplication is provided by roller 45 acting on bearing surface 54 of third food compression member 50. Roller 45 is provided in a slot of handle 41 of lever or lever assembly 40. In operation, handle 41 is pushed towards third compression member 50 such that roller or cam surface 45 acts on bearing surface 54 of third food compression member 50. In this embodiment, third food compression member 50 rotates about a pivot point located near the bottom of third compression member frame 51. The primary difference between the embodiment of food press 10 shown in FIG. 7 and food press 10 shown in FIG. 8 is that cammed surface 45 of FIG. 7 is replaced by a simple sliding surface or roller 45 in FIG. 8. This sliding surface engages inclined surface 54 in a manner similar to that of cammed surface 45 in the embodiment shown in FIG. 7.

Figure 9:
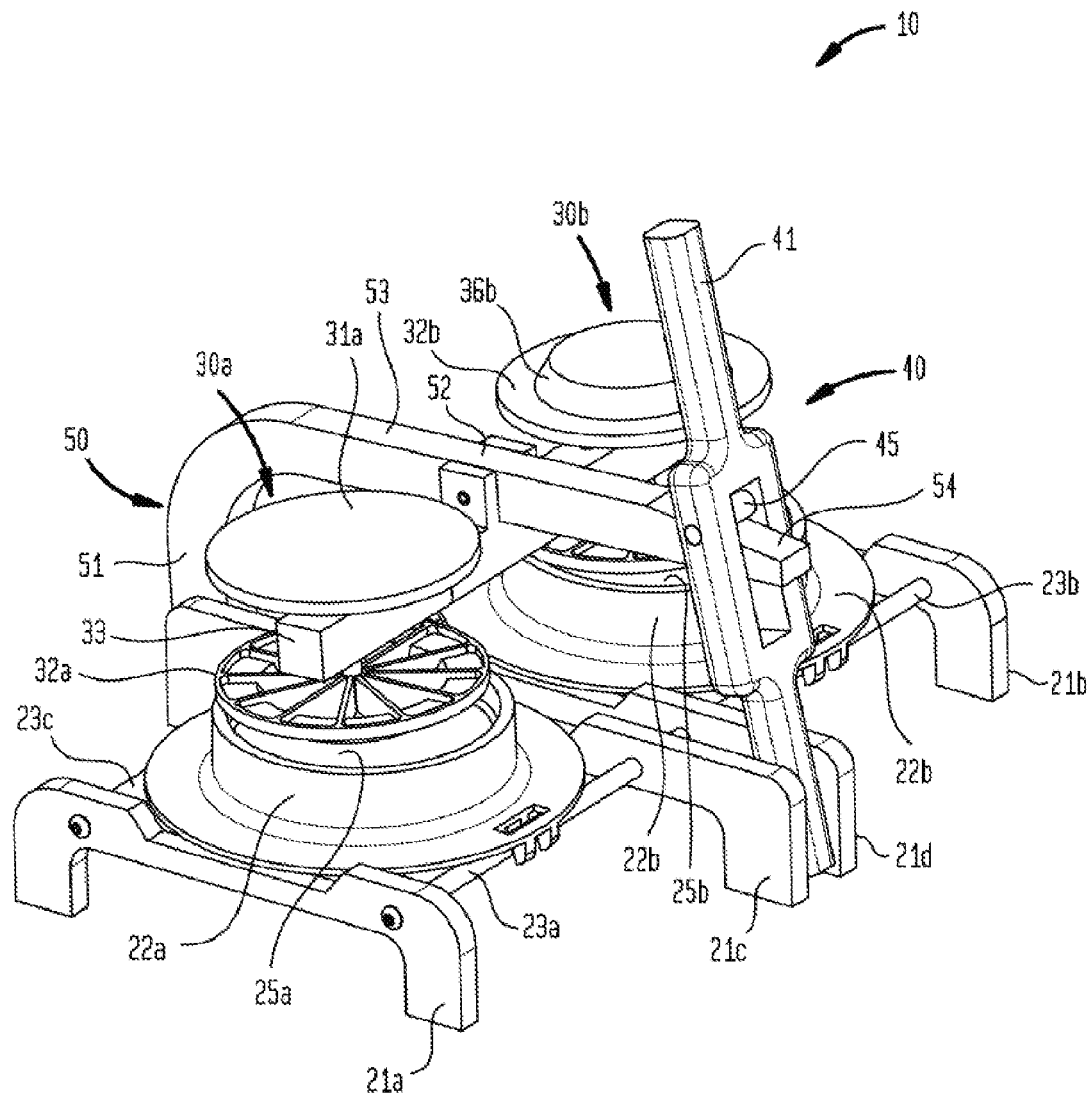
FIG. 9 shows an embodiment that utilizes a roller combined with an inclined plane mechanism and utilizes two press head assemblies and two base molds to produce two shaped and compressed food products at the same time.

Referring now to FIG. 9, there is shown yet another embodiment. This embodiment is similar to that shown in FIG. 8, but comprises two base mold or first food compression members 22a and 22b, and two second food compression press members 31/32. Any suitable combination of multiple press heads and base mold assemblies may be used with any suitable combination of force multiplying levers, cams, inclined planes, and roller elements to create a food press that produces ratio of force applied to the food product and force applied to the device that is about 2:1 or greater, resulting in improved compression and sealing of the shaped and compressed food product.

In still another embodiment, there is provided a method of forming a shaped and compressed food product using food press 10 comprising first food compression member 22, second food compression member 31 and/or 32 configured to engage or be engaged by at least portions of first food compression member 22, frame or base 20 comprising at least one guide 24 configured to constrain movement substantially along a single direction of at least one of first and second food compression members 22 and 31 and/or 32, and at least one lever 40 operably connected to frame or base 20 and configured for a user or external force to act upon to compress or cause to be compressed food placed between first and second food compression members 22 and 31 and/or 32. First food compression member 22, second food compression member 31 and/or 32, and lever 40 are together configured to compress or cause to be compressed food placed between first and second food compression members 22 and 31 and/or 32 to form a shaped and compressed food product. At least one of first and second food compression members 22 and 31 and/or 32 is further configured to engage guide 24 and to be constrained thereby to move substantially in a single direction as the user or external force acting upon lever 40 causes the food compression members to compress the food therebetween. The method comprises: (a) placing food in or on the first or second food compression members, and (b) pressing the lever against the second food compression member to cause the food to be compressed between the first and second food compression members thereby to form the shaped and compressed food product.

In yet another embodiment, there is provided a method of forming a shaped and compressed food product using food press 10 comprising first food compression member 22, second food compression member 31 and/or 32 configured to engage or be engaged by at least portions of first food compression member 22, third rotatable food compression member 50 configured to operate in conjunction with first and second food compression members 22 and 31 and/or 32, frame or base 20 comprising at least one guide 24 configured to constrain movement substantially along a single direction of at least one of second food compression member 31 and/or 32 and third food compression member 50, and at least one lever 40 operably connected to frame or base 20 and configured for a user or external force to act upon to cause the lever or a portion of lever 40 to engage one or more first portions 54 of third compression member 50 as lever 40 or a portion of lever 40 is pressed against first portions 54 by the user or the external force thereby to cause an end 51 of third compression member 50 to rotate and cause the third compression member 50 to compress or cause to be compressed food placed between first and second food compression members 22 and 31 and/or 32. First food compression member 22, second food compression member 31 and/or 32, third food compression member 50 and lever 40 are together configured to compress or cause to be compressed food placed between first and second food compression members 22 and 31 and/or 32 to form a shaped and compressed food product. At least one of second and third food compression members 31 and/or 32 and 50 is further configured to engage the at least one guide 24 and to be constrained thereby to move substantially in a single direction as the user or external force acting upon lever 40 causes third food compression member 50 to compress food between first and second food compression members 22 and 31 and/or 32. The method comprises: (a) placing food in or on the first or second food compression members, and (b) pressing the lever against the second food compression member to cause the food to be compressed between the first and second food compression members thereby to form the shaped and compressed food product.

Those skilled in the art will appreciate after having read and understood the present specification, drawings and claims that disclosed herein are highly effective and advantageous systems, devices, components and methods for forming ground beef, ground game, ground or flaked fish, ground vegetable products, or other malleable foods into patties or other shaped and compressed food products by using mechanical means to substantially increase the force a user can apply during the food compression and shaping process. Such mechanical means include, but are not limited to, guides, levers, cams, inclined planes and the like to multiply and control the force applied to food as compared to the force applied to the device by a user. After having read and understood the present specification, drawings and claims, those skilled in the art will now understand and appreciate that the various embodiments described herein provide solutions to long-standing problems in the use of hand-operated and home food presses, such as an inability to produce shaped and compressed food products that maintain their structural integrity and shape when removed from a food press owing to low fat content and an inability to provide sufficient compressional forces to the food product.

The foregoing has outlined features of several embodiments so that those skilled in the art may better understand the detailed description set forth herein. Those skilled in the art will now understand that many different permutations, combinations and variations of food press 10 described and disclosed herein fall within the scope of the various embodiments. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure. The above-described embodiments should be considered as examples, rather than as limiting the scopes thereof.

We claim:

1. A food press, comprising:
    a first food compression member;
    a second food compression member configured to engage or be engaged by at least portions of the first food compression member;
    a frame or base comprising at least two guides configured to constrain movement substantially along a single linear direction of at least one of the first and second food compression members, and
    at least one lever operably connected to the frame or base and configured for a user or external force to act upon to compress or cause to be compressed food placed between the first and second food compression members, the at least one lever comprising at least first and second lever arms;
    wherein the first food compression member, the second food compression member, the at least two guides and the lever are together configured to compress or cause to be compressed food placed between the first and second food compression members to form a shaped and compressed food product, at least one crossbar attached to or forming a portion of at least one of the first and second food compression members is configured to engage the at least two guides and to be constrained thereby to move substantially in a single linear direction as the user or external force acting upon the lever and the at least one crossbar causes the at least first and second food compression members to compress the food therebetween, and portions of the first and second lever arms are configured to engage and be pressed against first portions of the crossbar by the user or the external force.

2. The food press of claim 1, wherein the first food compression member comprises a food receptacle configured to hold or receive food therein.

3. The food press of claim 1, wherein the first food compression member is operably attached or secured to, or forms a portion of, the base or frame.

4. The food press of claim 1, wherein the second food compression member comprises a first press head.

5. The food press of claim 1, wherein surfaces of the first portions of the at least one crossbar are shaped and configured to accept the portions of the first and second lever arms thereon.

6. The food press of claim 1, wherein the at least one crossbar further comprises at least two second portions configured to engage the at least two guides and be constrained thereby such that the press head moves substantially in a single linear direction along the guide and towards the first food compression member as the lever is pressed against the at least two first portions.

7. The food press of claim 4, wherein the second food compression member further comprises a second press head that is configured to shape food differently from the first press head.

8. The food press of claim 4, wherein the second press head is configured to form at least one pocket or cavity in the food for stuffing.

9. The food press of claim 8, wherein the second press head comprises a truncated cone configured to form the at least one pocket or cavity in the food for stuffing.

10. The food press of claim 1, wherein the lever comprises proximal and distal portions, and the proximal portion of the lever is at least one of pivotably, swingingly, swivelably, rotatably and hingeably connected to the base or frame.

11. The food press of claim 10, wherein the distal portion of the lever comprises at least one handle for the user to grab or hold when compressing or causing to be compressed food placed between the first and second food compression members.

12. The food press of claim 1, wherein the base or frame further comprises at least first and second base elements, and each of the first and second base elements comprises first and second guides, respectively.

13. The food press of claim 12, wherein the first and second food compression members are disposed at least partially between the first and second base elements.

14. The food press of claim 12, wherein the second food compression member comprises the crossbar.

15. The food press of claim 1, wherein the at least one guide comprises a slot, a channel, at least one tab, geared teeth, a ratchet, a pawl, a pinion, a gear rack, a toothed bar, a groove, a ridge, or a tongue.

16. The food press of claim 14, wherein the second food compression member comprises at least one mechanical element configured to engage and mate with at least one of the at least two guides.

17. The food press of claim 1, wherein the lever, the frame or base, and at least one of the first and second food compression members are together configured to provide a second compressional force to food placed between the first and second food compression members that is at least twice a first force applied by the user or the external force to the lever.

18. The food press of claim 1, wherein the lever, the frame or base, and at least one of the first and second food compression members are together configured to provide a second compressional force to food placed between the first and second food compression members that ranges between about two times and about three times a first force applied by the user or the external force to the lever.

19. The food press of claim 1, wherein first and second compression members are together configured to shape and compress the food into a concave shape, a convex shape, a circular shape, a patty shape, a cylindrical shape, a rectangular shape, a square shape, a crenulated shape, a star shape, a triangular shape, an irregular shape, a wavy shape, a geometrically symmetrical shape, geometrically asymmetrical shape, a bar shape, a rod shape, a round shape, a spherical shape, or an elliptical shape.

* * * * *